(12) United States Patent
Chiu et al.

(10) Patent No.: US 6,999,420 B1
(45) Date of Patent: Feb. 14, 2006

(54) METHOD AND APPARATUS FOR AN ARCHITECTURE AND DESIGN OF INTERNET PROTOCOL QUALITY OF SERVICE PROVISIONING

(75) Inventors: Angela L. Chiu, Holmdel, NJ (US); Seyhan Civanlar, Middletown Township, Monmouth County, NJ (US); Albert Gordon Greenberg, Millburn (DE); Zhuangbo Tang, Tinton Falls, NJ (US)

(73) Assignee: AT & T Corp., New York, NY (US)

( * ) Notice: Subject to any disclaimer, the term of this patent is extended or adjusted under 35 U.S.C. 154(b) by 0 days.

(21) Appl. No.: 09/476,309

(22) Filed: Dec. 30, 1999

(51) Int. Cl.
H04L 12/54 (2006.01)
(52) U.S. Cl. .................. 370/231; 370/395.21; 370/468
(58) Field of Classification Search ........ 370/230–235, 370/252–254, 401–402, 412–413, 466, 474, 370/351, 237, 238, 395.2–395.43
See application file for complete search history.

(56) References Cited

U.S. PATENT DOCUMENTS

| | | | |
|---|---|---|---|
| 6,240,463 B1 * | 5/2001 | Benmohamed et al. ..... | 709/238 |
| 6,317,416 B1 * | 11/2001 | Giroux et al. .............. | 370/232 |
| 6,353,616 B1 * | 3/2002 | Elwalid et al. ............. | 370/443 |
| 6,385,172 B1 * | 5/2002 | Kataria et al. .............. | 370/238 |
| 6,405,257 B1 * | 6/2002 | Gersht et al. ............... | 709/235 |
| 6,442,138 B1 * | 8/2002 | Yin et al. ................... | 370/232 |
| 6,463,068 B1 * | 10/2002 | Lin et al. .................... | 370/414 |
| 6,493,317 B1 * | 12/2002 | Ma ............................. | 370/237 |
| 6,504,819 B2 * | 1/2003 | Fowler et al. .............. | 370/230 |
| 6,526,060 B1 * | 2/2003 | Hughes et al. ........... | 370/395.4 |
| 6,594,268 B1 * | 7/2003 | Aukia et al. ................ | 370/400 |
| 6,693,909 B1 * | 2/2004 | Mo et al. .................... | 370/392 |
| 6,721,270 B1 * | 4/2004 | Mitra et al. ................. | 370/230 |
| 6,847,613 B2 * | 1/2005 | Mimura et al. ............. | 370/235 |
| 6,885,638 B2 * | 4/2005 | Xu et al. ..................... | 370/230 |
| 6,888,842 B1 * | 5/2005 | Kirkby et al. .............. | 370/414 |
| 2002/0112814 A1 * | 8/2002 | Hafner et al. ............ | 156/272.2 |

OTHER PUBLICATIONS

A. K. Parekh and R. C. Gallager, "A Generalized Processor Sharing Approach to Flow Control in Integrated Services Network: The Multiple Node Case," *IEEE/ACM Transactions on Networking*, Apr. 1994, pp. 137-150.

A. K. Parekh and R. C. Gallager, "A Generalized Processor Sharing Approach to Flow Control in Integrated Services Networks: The Single-Node Case," *IEEE/ACM Transactions on Networking*, Jun. 1993, pp. 344-357.

(Continued)

*Primary Examiner*—Zarni Maung
*Assistant Examiner*—Van Nguyen (57) ABSTRACT

An architecture, design, and realization for providing Quality of Service (QoS) to Internet Protocol (IP) networks based on a three-class differentiated service scheme where the service provider uses a resource management system and a schedule optimizer to enable the optimal use of bandwidth and buffer resources at each node along the various links between the ingress and egress points in a network. The resource reservation system checks to determine whether sufficient bandwidth resources are available along the path requested by the customer for a particular class. The schedule optimizer ensures that sufficient buffer resource allocations and parameter settings are made to optimally reach the predetermined QoS criteria for each of the three classes. The system also contains a mechanism supporting resource reservations providing additional resources along alternative paths if the selected path links fail in the network.

15 Claims, 8 Drawing Sheets

OTHER PUBLICATIONS

J. Padhye, V. Firoiu, D. Towsley and J. Kurose, "Modeling TCP Throughput: A Simple Model and its Empirical Validation," *In Proceedings of Sigcomm 98*, pp. 1-12.

V. Jacobson, K. Nichols, K. Poduri, "An Expedited Forwarding PHB", *IETF RFC2598*, Jun. 1999, pp. 1-10.

S. Blake, D. Black, M. Carlson, E. Davies, Z. Wang and W. Weiss, "An Architecture for Differentiated Services," *RFC2475*, Dec. 1998, pp. 1-36.

S. Shenker, C. Partridge and R. Guerin, "Specification of Guaranteed Quality of Service," *IETF RFC2212*, Sep. 1997, pp. 1-20.

J. Wroclawski, "Specification of the Controlled-Load Network Element Service," *IETF RFC2211*, Sep. 1997, pp. 1-19.

S. Floyd and V. Jacobson, "Random Early Detection Gateways for Congestion Avoidance," *IEEE/ACM Transaction on Networking*, Aug. 1993, pp. 1-32.

* cited by examiner

METHOD AND APPARATUS FOR AN ARCHITECTURE AND DESIGN OF INTERNET PROTOCOL QUALITY OF SERVICE PROVISIONING

FIELD OF THE INVENTION

This invention relates to a method and apparatus for an architecture and design of an Internet Protocol (IP) Quality of Service (QoS) provisioning. Specifically, the invention implements separate classes of services according to design parameters for ensuring maximum deliverability of packets for the highest levels of service.

RELATED APPLICATION

Another patent application was filed concurrently and is hereby incorporated by reference. That application was entitled "Method and Apparatus for Provisioning and Monitoring Internet Protocol Quality of Service" and was assigned U.S. Pat. No. 6,744,767.

BACKGROUND

Quality of Service (QoS) mechanisms for packet transmission typically utilize data path mechanisms (packet classification, policing, shaping, buffering, and scheduling) and control path mechanisms (signaling, resource reservation, routing) for ensuring packet delivery during periods of network congestion. Currently within the networking community, there exist two schools of thought regarding QoS, represented by two working groups of the Internet Engineering Task Force (IETF). The first school of thought, Integrated Services (int-serv), supports fine-grained data path and control path QoS mechanisms, while the second school of thought, Differentiated Services (diff-serv), supports coarse-grained mechanisms that apply to a small set of aggregate flow classes. Int-serv mechanisms may provide the appropriate solution in the longer term; however, the QoS mechanisms now available from most mature router vendors correspond more closely with the diff-serv mechanisms.

The main concepts of diff-serv are: (1) aggregates of flows (rather than individual flows) receive a service; (2) the forwarding engine is required to provide delay and loss guarantees in a statistical or relative (rather than absolute quantitative) sense; and (3) the forwarding treatment that should be received by a packet is identified by a byte in the packet header, rather than by a flow lookup. The flow aggregates in diff-serv can be specified in several ways. To illustrate, consider a corporation that has three sites. Each site communicates with all the other sites over the Internet. A site may also communicate with other entities connected to the global Internet. In such a case, the flow aggregates that should receive differentiated QoS can be specified by:
1. Point-to-point flows—a set of packets originating from a first site and destined to a second site.
2. Point-to-multi-point flows—a set of packets originating from a first site and destined to either a second or a third site.
3. Point-to-any-point flows—any packet that originates from a first site and destined to any other site.

To signal resource reservation needs, the IETF has developed the Reserve Reservation (RSVP) hop-by-hop protocol. Although RSVP was initially intended for int-serv, it was later realized that RSVP provides adequate signaling support for aggregates of traffic flows, such as those found in diff-serv schemes. In the diff-serv schemes, hop-by-hop signaling is used only for admission control, not for creating per-flow state in intermediate routers, as is typically done in the int-serv scheme.

A need exists for an architecture and design supporting Quality of Service (QoS) features using Internet Protocol supporting (1) a guarantee of performance under certain conditions, (2) supporting differentiation of product services with Internet providers, and (3) attaining economies of scale with multiple services integrated on a common network. The QoS should maximize the probability of delivery of packets for the highest levels of service while minimizing the probability of dropped packets. However, this optimization should not erode the lowest levels of service such that packet delivery delays for lower, classes of services are so long that the lower classes of services cease to deliver the level of subscribed service.

This invention is a diff-serv architecture, design, and realization for providing quality of service using Internet Protocol based on a multi-class differentiated service scheme where the service provider uses a resource management system operating on a computer to enable the optimal use of bandwidth and buffer resources at each router along the various links between the ingress and egress points in a network. The resource reservation system checks to determine if sufficient bandwidth resources are available along the path requested by the customer for a particular class-determining the parameters such that a packet can be transmitted according to the desired service class.

The resource management system optimizes packet traffic flow from the values for the maximum QoS deterioration of the traffic caused by reservations for Virtual Leased Line traffic, the maximum QoS deterioration of the Basic service caused by the Assured service, and the packet loss ratios of the Assured versus the Basic services. These values provide information necessary for determining capacity planning and provide the minimum utilization of a link to be considered when congestion occurs. Average utilization of Virtual Leased Line traffic with respect to the peak rate subscribed along each link is computed versus the maximum percentage of the total Virtual Leased Line subscription with respect to the link capacity. Preconfiguration of all the routers with parameter settings for Weighted Fair Queuing (WFQ), buffer allocations, and Weighted Random Early Discard (WRED) further allows the resource reservation system to maintain the desired QoS in the network.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
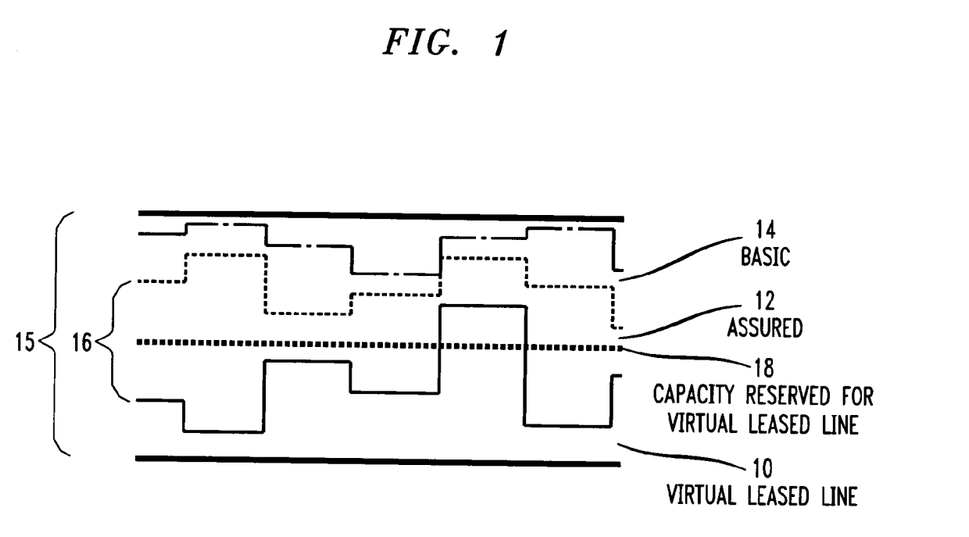
FIG. 1 illustrates the hierarchy of service classifications according to Virtual Leased Line, Assured and Basic service classes in a fixed bandwidth environment.

FIG. 1 illustrates the three classes of services: Virtual Leased Line (10), Assured (12) and Basic (14) services supported across a data line of fixed bandwidth (15) for Quality of Service (QoS) functionality. These three classes of services have different characteristics in order to satisfy the service demands of a user. At the highest level in the QoS hierarchy, Virtual Leased Line service (10) is designed for applications and customers that require predictable point-to-point performance. A Virtual Leased Line (10) is a point-to-point connection with a guaranteed peak transmission rate. By implementing performance restrictions and by setting criteria on the line, packet loss due to network congestion, delay, and delay-jitter is minimized. Examples of applications employing Virtual Leased Line level of service (10) include Voice over Internet Protocol (VoIP), transaction processing, and multimedia applications that require low delay and jitter.

The second class of service in the hierarchy is Assured service (12) and is designed for customers who need "better than best-effort service." When congestion exists, packets that receive Assured service (12) gain a degree of priority over packets that receive Basic service (14) in terms of packet loss. Basic service (14), the lowest class of service, is designed for customers who require general Internet access where some delay is not critical to the success of the application. Basic service (14) is the equivalent of best-effort delivery service, that is widely used in current Internet servicing.

A Virtual Leased Line (10) can be realized independently of Assured service, and vice versa. The three-class model can be extended with more classes to include additional enhanced classes that are similar to the Virtual Leased Line service (10) class but also provides for over-booking of packets and thus can be subscribed to by a customer at a less expensive rate. Typically, a Virtual Leased Line (10) transmitting packets is not over-booked. During intervals where Virtual Leased Line (10) data flows do not use their allotted bandwidth, the remaining bandwidth (16) is available to the Assured (12) and Basic (14) traffic flows. That is, Assured (12) and Basic (14) traffic flows share the bandwidth not committed to Virtual Leased Line (10) traffic flows as well as any idle bandwidth committed to Virtual Leased Line (10) traffic flows.

Since Assured packets obtain higher priority handling than Basic packets during periods of congestion, Assured (12) traffic flows obtain a degree of protection against overloads of Basic (14) traffic. Assured (12) packets get priority over Basic (14) packets at each hop; but unlike the case for Virtual Leased Line (10) packets, the routers provide no guarantee that the delays at all hops along the flow path will be small. Instead, traffic measurement, provisioning systems plans and management of the network capacity allow Assured (12) traffic flows to experience small delays with sufficiently high probability. With appropriate traffic engineering and pricing, Assured (12) traffic consistently sees a lightly loaded "best-effort" network.

As illustrated in FIG. 1, traffic capacity on a particular link is shared among Virtual Leased Line (10), Assured (12), and Basic (14) traffic services. Virtual Leased Line (10) traffic obtains the highest priority, but is limited by a traffic rate cap (18). When idle, Virtual Leased Line (10) capacity can be utilized (16) by Assured (12) and Basic (14) packets. One mechanism for optimizing traffic flow supports a prioritized dropping of some of the packets differentiating Assured (12) traffic flow from Basic (14) traffic flow.

The three classes of service operate using a traffic priority scheme configured such that priority is given to Virtual Leased Line (10) traffic such that the service quality to the Assured (12) and Basic (14) classes is impacted. Likewise, the priority scheme for the Assured (12) service class impacts the quality of service to the Basic (14) service class.

Engineering guidelines for the appropriate choices of parameters and bandwidth allocation for each of the three classes for each link in the network are:

1. the maximum bandwidth reserved for the Virtual Leased Line class;
2. the weight assignments employed in a Weighted Fair Queuing ("WFQ") packet scheduling mechanism (alternative schemes could employ variations of weighted round robin schemes such as Modified Deficit Round Robin ("M-DRR") as an approximation of WFQ when the number of queues is small);
3. the global and local thresholds for buffer management; and
4. parameters for configuring a Weighted Random Early Discard ("WRED") mechanism, for each of the three classes.

Virtual Leased Line service (10) guarantees a unidirectional reserved rate $R_f$ for a point-to-point flow. When packets arrive at an ingress point in the network at a rate exceeding $R_f$, they are dropped prior to entering the network. The reserved rate supported by the Virtual Leased Line service (10) may be renegotiated or may vary over time. Virtual Leased Line service (10) is similar to leased line service, but a leased line service guarantees a fixed delay, while the delay in Virtual Leased Line service (10) is variable but typically very low. While leased line service is also realized by reserving a physical circuit from the origin to destination, the Virtual Leased Line service (10) is typically realized on an Internet Protocol network that statistically multiplexes its resources among several services across a virtual circuit. Finally, the time-scale at which the transmission rate can be changed is smaller for a Virtual Leased Line (10) service than a leased line service.

The essence of the point-to-point restriction for Virtual Leased Line (10) bandwidth can be guaranteed between a pair of ingress and egress routers by reserving appropriate bandwidth on all routers along the path of transmission. This eliminates the difficulties associated with providing a high quality service across many possible (non-deterministic) paths, particularly when the egress points can vary. Under congestion conditions, each link along the path is designed to have a sufficient bandwidth to carry the Virtual Leased Line traffic with no packet loss due to the provisioning features of the Virtual Leased Line service (10).

Figure 2:
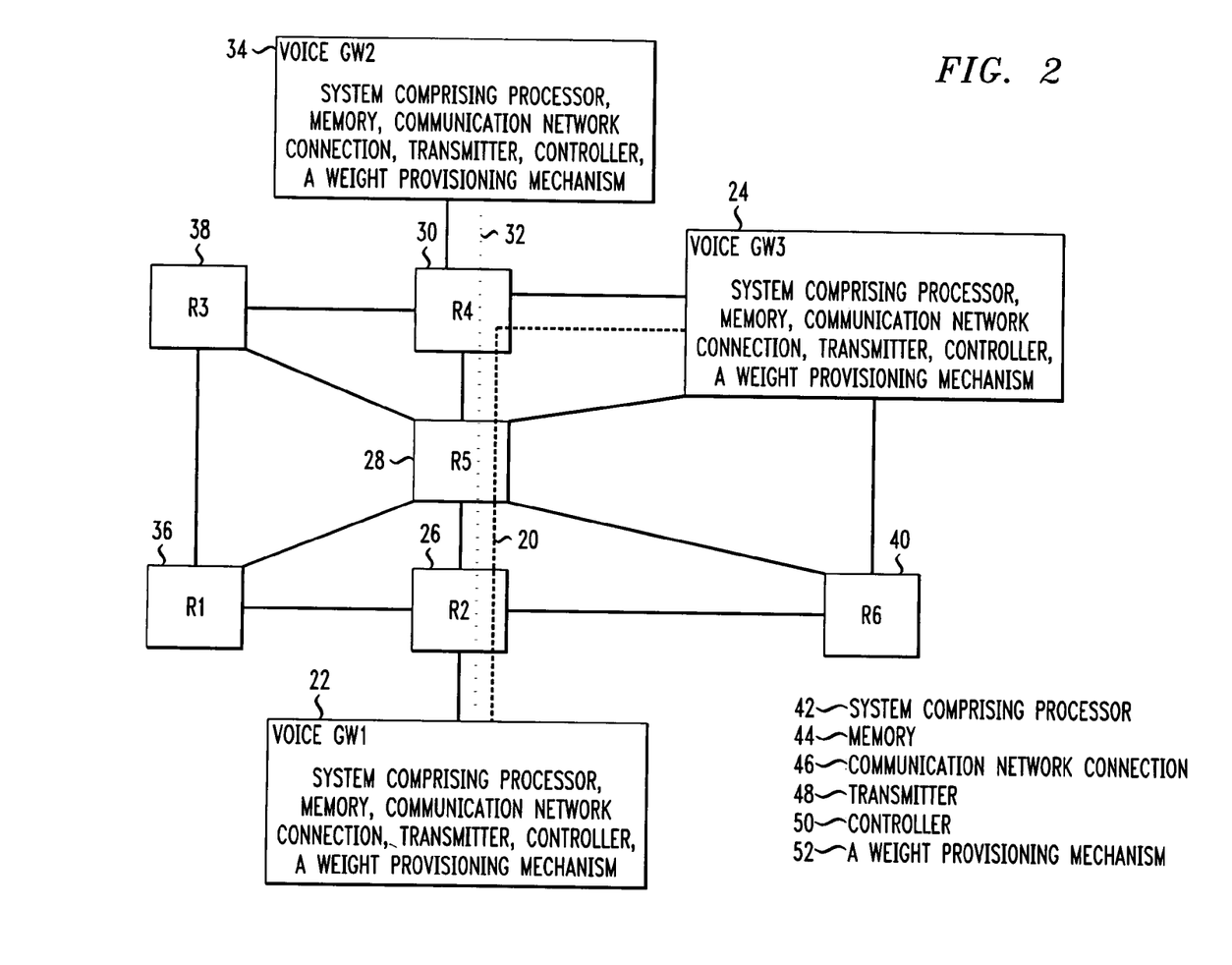
FIG. 2 illustrates the routing scheme of a typical path for data or voice over a series of routers.

FIG. 2 illustrates the routing scheme of a typical path for data or voice over a series of nodes. In FIG. 2, the path of a first Virtual Leased Line (20) across voice gateways 1 (22) and 3 (24) traverses nodes R2 (26), R5 (28) and R4 (30), respectively. Typically, R2 (26), R5 (28) and R4 (30) are routers but other communication devices can also be utilized to receive and transmit packets along the communication network. Similarly, the path of a second Virtual Leased Line 32, across voice gateways 1 (22) and 2 (34) traverses the same routed path. Thus, the bandwidth requests for the first (20) and second (32) Virtual Leased Lines are reserved individually on the nodes R2 (26)–R5 (28) and R5 (28)–R4 (30) links, and the nodes R2 (26)–R5 (28), and R5 (28)–R4 (30), respectively. In this illustration, the nodes R2 (26)–R5 (28), and R5 (28)–R4 (30) are routers.

Each of the nodes along the path for the first (20) and the second (32) Virtual Leased Lines must reserve a sufficient bandwidth for the packet traffic resources for both the Virtual Leased Lines (20) and (32) operating at peak performance. Additional nodes or routers RI (36), R3 (38) and R6 (40) can be connected to the nodes or routers handling the first Virtual Leased Line (20) and the second Virtual Leased Line (32). Allocation of the bandwidth also needs to be determined for any Virtual Leased Line services being handled through these nodes.

The voice gateways 1 (22), 2 (34) and 3 (24) comprise systems that are typically computers, routers or information appliances that typically include a microprocessor (42), memory system (44), and a communication interface or connection (46) that allows the system and voice gateway to be connected to the communication network. Other components comprising the system are a transmitter/receiver device (48), a controller (50), and a weight provisioning mechanism (52). The communication interface or connection (46) may be a modem or other data packet transmission and receiving device. The transmitter/receiver device (48) is capable of sending and receiving packets to and from the system to the communication network. The controller (50) is capable of determining at the ingress point on the communication network whether the packets are assigned to the first service class and whether these packets can be sent at a transmission rate corresponding to the first service class along each of the link paths (connections between voice gateways and routers or between two routers) on the communication network. The weight provisioning mechanism (52) is capable of assigning priority classification weights to the first set of packets according to a predetermined scheme such as Weighted Fair Queuing (WFQ) or Modified Deficit Round Robin (M-DRR). The components described above do not necessarily have to be located within the same system or computer but can be coupled or connected together to form the system.

If the Virtual Leased Line (32) fails at node R5 (28), then the architecture will redirect packet traffic along alternative routes. When the Virtual Leased Line (32) is established, a calculation is made along alternative pathways such as the data pathway connected by nodes R2 (26)–R1 (36)–R3 (38)–R4 (30). When node R5 (28) fails, the architecture automatically redirects the packet traffic along the alternative pathway because the architecture has reserved Virtual Leased Line bandwidth along the alternative pathways.

If and when traffic congestion conditions occur, the links between nodes R4 (30)–R5 (28) and R5 (28)–R2 (26) must be able to serve all Virtual Leased Line service links in the route. Thus, the summation of all the reserved rates or guaranteed bandwidth for Virtual Leased Lines on a particular link must be less than the total bandwidth allocation for Virtual Leased Line class on that link. Guarantees for no packet loss for Virtual Leased Line service can only be made if the aggregate rate reserved for all the Virtual Leased Lines services on any link is less than the total capacity available on that link. The bandwidth share that can safely be dedicated to Virtual Leased Line service without adverse impact on Assured and Basic classes requires setting some predetermined criteria and parameters.

Various levels of service availability can be provided on links based on the time scale corresponding to recover time from a link, node or router failure. Given enhanced forwarding and routing capabilities typical of most routers, such as those available in Multi-Protocol Layered Switching (MPLS), recovery times can be reduced to the millisecond range. If the Virtual Leased Line service guarantees are to be maintained during a router failure, then Virtual Leased Line capacity planning and admission control has to account for the alternative paths that must be reserved for different failure scenarios. However, accounting for these alternative paths may limit the total amount of Virtual Leased Line traffic admitted along the various links.

Figure 3:
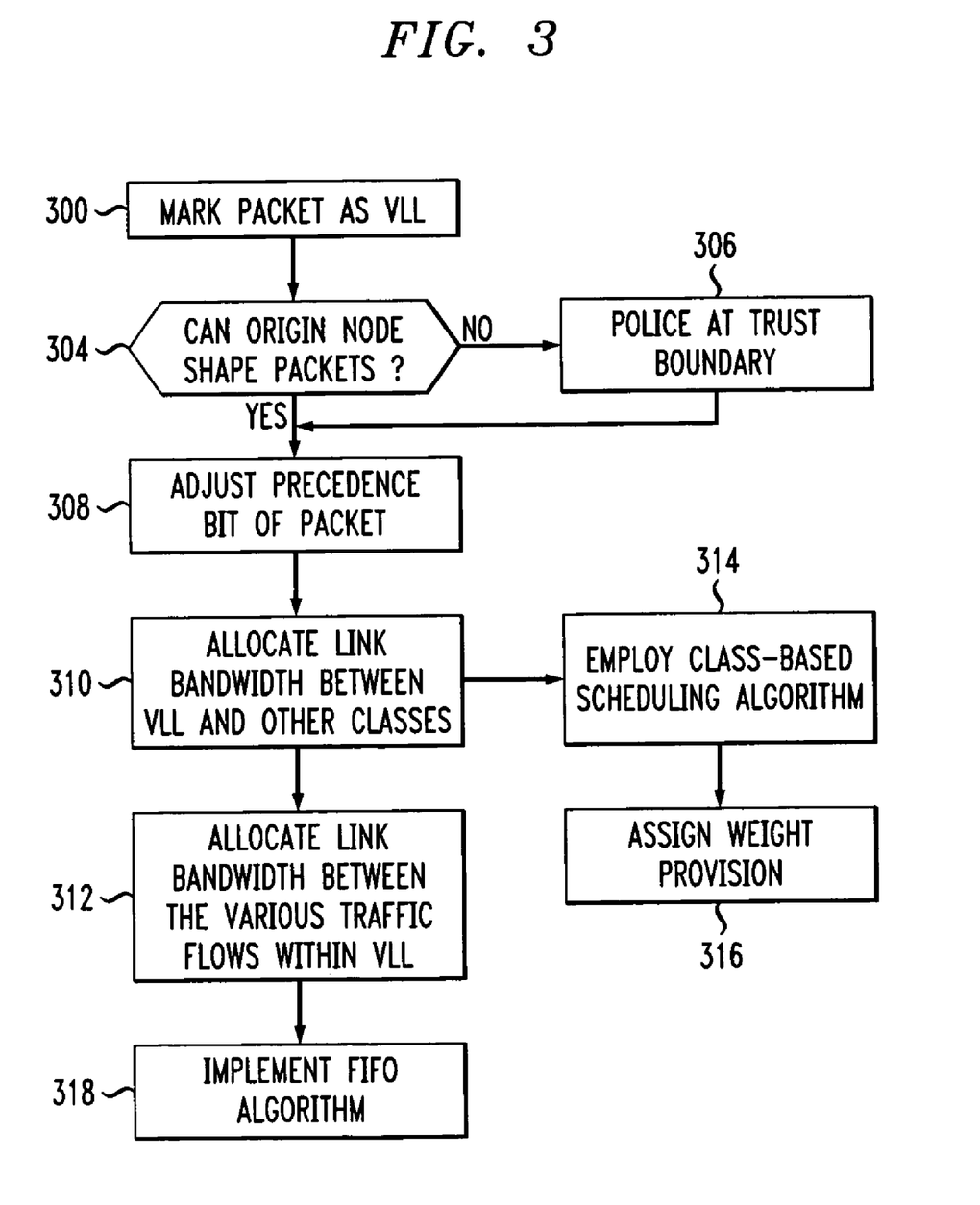
FIG. 3 illustrates the Virtual Leased Line origin shaping the traffic for the Virtual Leased Line service.

FIG. 3 illustrates the Virtual Leased Line origin shaping the traffic for the Virtual Leased Line service. The packets are marked by a resource management system operating on a computer according to the Virtual Leased Line service class (300). If a computer or server connected to the origin node or ingress point of the network cannot be trusted to shape the packets appropriately (304), then the policing is carried out at the trust boundary (306). This is accomplished by implementing the appropriate setting of the Internet Protocol precedence bits of the packet (308). In particular, using the router's policing mechanism, the ingress router can drop packets arriving at a rate exceeding the reserved rate.

The router identifies the packets belonging to the Virtual Leased Line service class based on the Diffserv Codepoints (DSCP) in the packet's header. The expedited packet handling behavior denotes the Virtual Leased Line service class. To access the Virtual Leased Line service, the router makes the following two scheduling decisions:

1. Allocation of link bandwidth (310) between the Virtual Leased Line and other service classes.
2. Allocation of link bandwidth (312) between the various traffic flows within the Virtual Leased Line class.

The allocation of link bandwidth (310) between the Virtual Leased Line and other service classes provides extremely low delay and jitter to the Virtual Leased Line service class; the router is programed to prioritize the scheduling. The router may employ a class-based scheduling algorithm (314) that allocates the bandwidth among various service classes in a weighted fair manner (316), such as by WFQ or M-DRR. In this embodiment, the router may have to emulate priority behavior by assigning a sufficiently large weight to the Virtual Leased Line class. This weight provision may be required to be significantly larger than what is typically necessary to allocate the desired bandwidth to the appropriate class. For example, if 20% bandwidth is allocated to Virtual Leased Line, a network administrator may have to assign a weight that allocates 50% bandwidth.

For allocation of link bandwidth (312) between the various flows within the Virtual Leased Line class, the router could employ a single first-in, first-out ("FIFO") relationship scheme (318) for these traffic flows. There may be an advantage to using separate FIFOs if the Virtual Leased Line is used to aggregate smaller bursty flows; but for relatively smooth applications, such as Voice over IP ("VoIP") applications, a single FIFO is typically sufficient.

Virtual Leased Line service typically guarantees a near-zero packet loss due to congestion. This guarantee can typically only be made if the aggregate rate reserved for all the Virtual Leased Lines on any link is less than the capacity available on that link for the Virtual Leased Line service. As Multi-Protocol Layered Switching ("MPLS") mechanisms become available, they also can be used to provide enhanced control of the Virtual Leased Line path and to provide ultra-fast restoration capabilities in response to router failures. RSVP, as a signaling protocol for aggregate QoS flows, can also improve the flexibility of QoS subscriptions by changing the signaling protocol from a current static subscription to a dynamic subscription in both time-scale and rate renegotiations.

Figure 4:
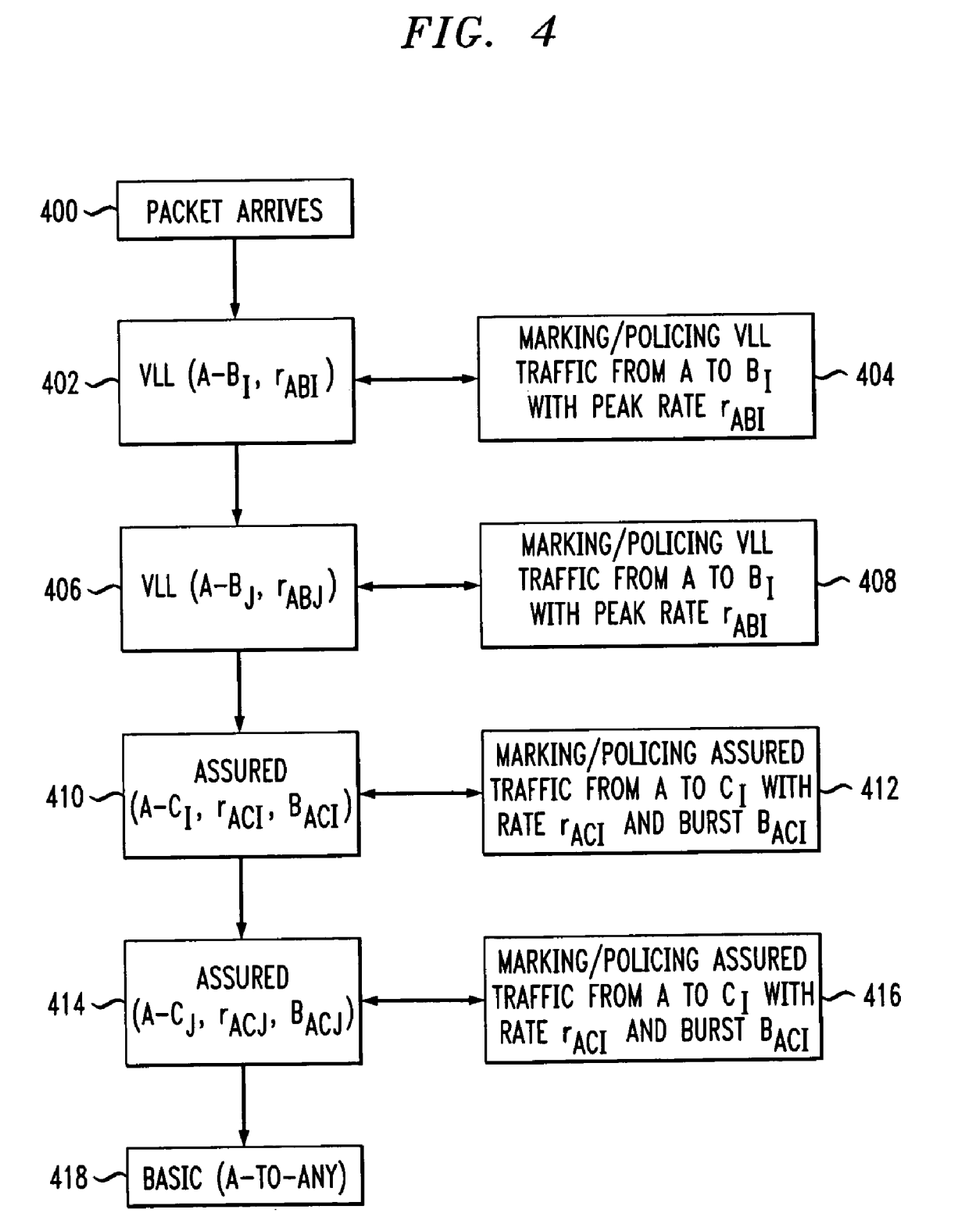
FIG. 4 illustrates a flow chart describing the policing and marking of the traffic generally.
Figure 5:
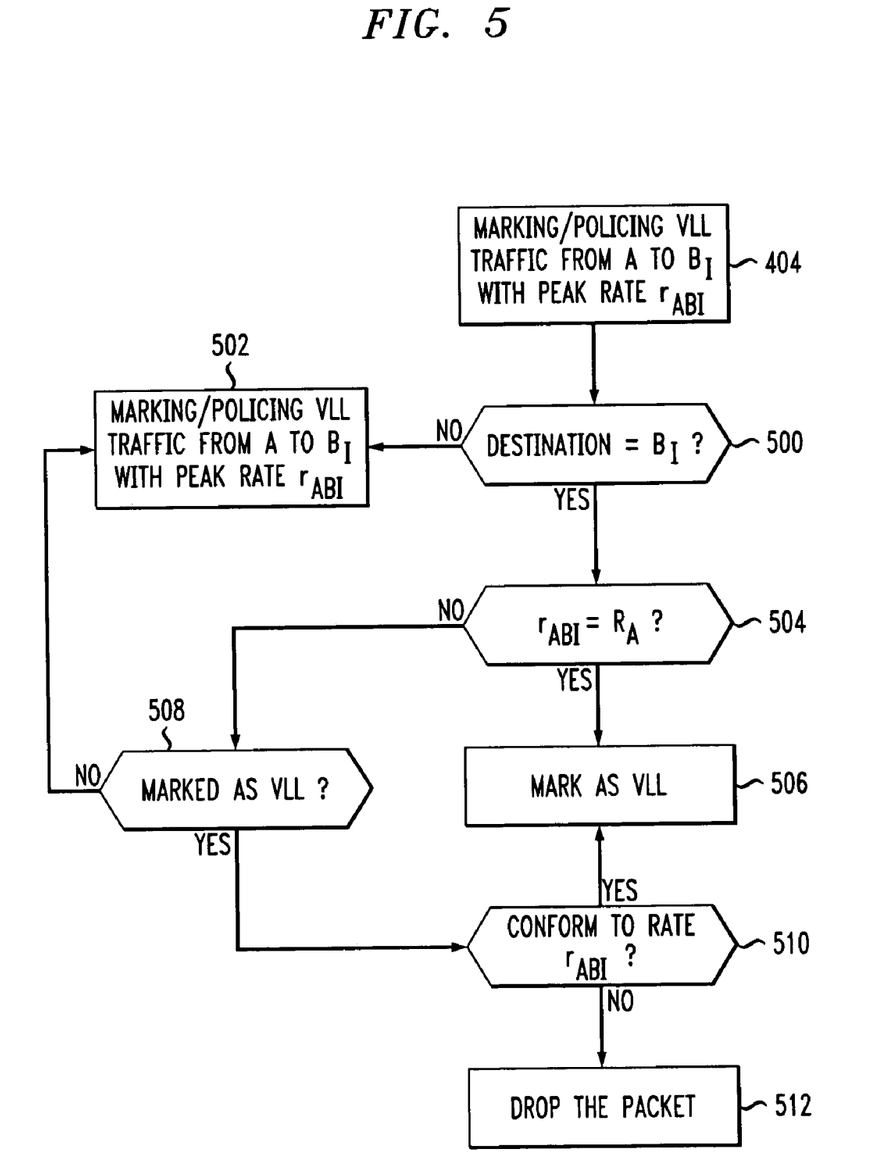
FIG. 5 illustrates a flow chart describing the marking and policing of Virtual Leased Line traffic.
Figure 6:
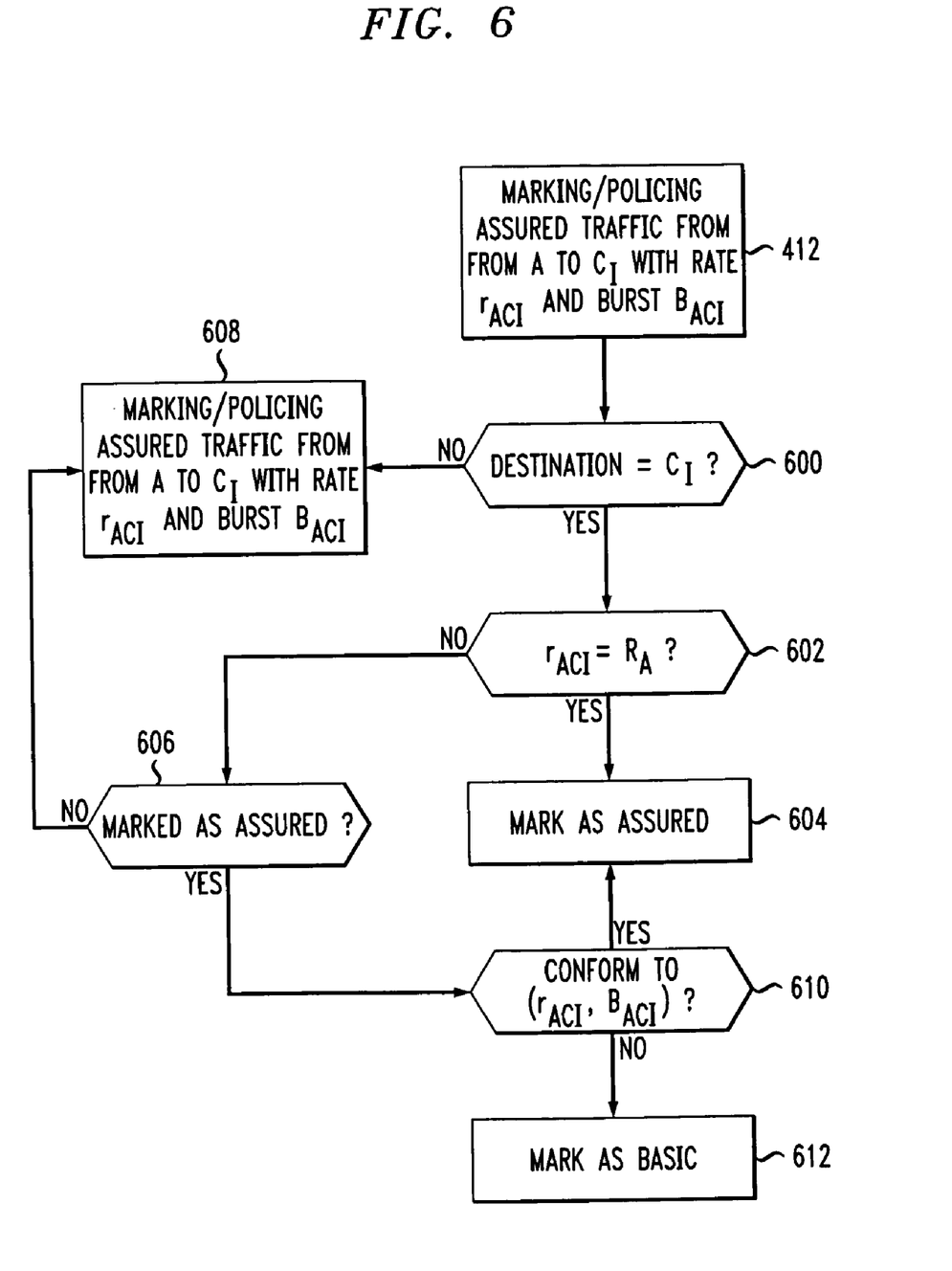
FIG. 6 illustrates a flow chart describing the marking and policing of Assured traffic.

FIG. 4 illustrates a flow chart describing the policing and marking of the traffic, FIG. 5 illustrates the marking and policing of Virtual Leased Line traffic, and FIG. 6 illustrates the marking and policing of Assured traffic. Virtual Leased Line service typically has a peak rate r. The end points for the Virtual Leased Line are the ingress and egress points in the network. Also included are QoS peering points where the network peers with other Internet Service Providers (ISPs) that provide similar class of services. Many subclasses of Virtual Leased Line services exist using the point-to-point, unidirectional network scheme. Typical examples include:

1. A point-to-point, unidirectional Virtual Leased Line service with a point-to-point, unidirectional network link. An example of this type of service is the transmission of international VoIP traffic from Taiwan to Mexico while the voice traffic on the reverse direction is carried through the traditional PSTN network.
2. A point-to-point, bidirectional Virtual Leased Line service, with asymmetric bandwidths in each direction with two point-to-point, unidirectional network links in the reverse direction, each possessing its own rate. This service type can be used to support a bidirectional line between two voice gateways.
3. A point-to-multipoint, unidirectional Virtual Leased Line service with a fixed aggregate rate r can be built with multiple point-to-point, unidirectional network elements with the same rate r. This service type can be used for a corporation central office to distribute real-time mission-critical information to a plurality of branch offices. In this example, the Virtual Leased Line traffic rate to any one point among the multiple points can be as large as r, given that the aggregate Virtual Leased Line traffic rate to all other points is zero. Comparing the same number of point-to-point, unidirectional Virtual Leased Line services each with its own access line and Virtual Leased Line rate r, the amount of the bandwidth reserved on the path to each egress point is the same in both cases. However, the potential amount of Virtual Leased Line traffic carried on the network is smaller in the former illustration since the aggregated Virtual Leased Line traffic is at most r, while the aggregated Virtual Leased Line traffic can be multiples of r to each egress point.
4. A multipoint-to-multipoint, bidirectional Virtual Leased Line service can be viewed as separate point-to-multipoint, unidirectional Virtual Leased Line service from each of the multiple points. This service type can be used for a corporation having mission critical information exchange among a few dedicated sites.

When a packet is ready to leave the ingress router (400), the Virtual Leased Line service determines the relationship between a customer's subscribed rate and their access rate. The rate of a point-to-point, unidirectional Virtual Leased Line from ingress router A to egress router B is denoted as $r_{AB}$ (402) and connects customer routers A and B, respectively. The marking and policing of Virtual Leased Line traffic from point A to a point $B_I$ also accounts for the peak rate $r_{ABI}$ along the link between the two points (404). Subsequent links (406) between additional links along the ultimate path of the Virtual Leased Line traffic is also determined for $r_{ABI}$ (408). By letting $R_A$ be the bandwidth of a customer's access link to the network, two cases can exist:

1. A full-access-rate scheme with $r_{AB}=R=_A$. For the link (404) or multiple links (408) described in FIG. 4, a determination is made in FIG. 5 as to whether the destination is to $B_I$ (500). If not, the traffic is marked as Virtual Leased Line traffic (502). When the subscribed Virtual Leased Line rate equals the subscription rate (504), all traffic directed to router B is marked by the ingress router A as Virtual Leased Line traffic regardless of whether the packet has been previously marked as another service classification (506). Hence, there is no requirement for rate-limiting of the traffic flow, but there is a requirement for packet classification for determining whether the packet was previously marked as Virtual Leased Line traffic. Otherwise, a determination is made as to whether the packet can be assigned a different route to the final destination or be sent by a lower subscription classification.
2. A sub-access-rate scheme where $r_{AB}<R_A$. This is the case where the subscribed Virtual Leased Line rate is lower than the subscription rate (507). In order to provide customers with the flexibility of defining that part of their traffic that is to be classified as Virtual Leased Line traffic, as well as to simplify provisioning at ingress routers, all Virtual Leased Line traffic is required to be marked (508) by the customer prior to reaching the ingress routers. In this illustration, there are both rate-limiting and packet filtering requirements to determine whether the rate of packets with Virtual Leased Line marking assigned to the destination address router B is within $r_{AB}$. If the packet is marked as Virtual Leased Line traffic (508) with its destination as router B (500), and the packet is within the rate limitation (510), then the packet is sent as Virtual Leased Line traffic (506). Otherwise, if the packet has router B as its destination and the traffic rate exceeds $r_{AB}$, then the packet is dropped (512), since marking it as a different class will result in assignment to a different buffer queue and may cause an out-of-order packet delivery. If the destination of the packet is not router B, then the scheme determines whether the packet can be sent by another, lower subscription class of service.

Assured service supports a "better than best-effort" service that relies on packet marking and dropping mechanisms to provide preferential treatment to Assured packets over Basic packets during periods of traffic congestion. In particular, if Weighed Random Early Discard (WRED) scheme is enabled to control packet dropping, the mechanism typically is configured so that the Assured packets that are arriving encounter drops at a much smaller probability than Basic packet arrivals. Typically, a traffic measurement tool is used to manage and monitor Assured traffic volumes and their stability, so that network administrators can engineer the network ensuring that Assured traffic has a controlled impact on the performance of Basic traffic. Assured service is typically subscribed with a rate and a burst size. If part of the Assured traffic from a customer exceeds the subscribed rate and burst allocations, then the Assured traffic for the customer is marked as Basic traffic.

For Assured service classes, without QoS peering with another ISP, Assured service is typically not supported for traffic originating from or destined to the general Internet backbone. Since it is not practical to specify all end points in the network except the ones from Internet Gateway Routers (IGRs), a network scheme for Assured traffic should emulate a Virtual Leased Line service, providing point-to-point, unidirectional with a rate r and burst B. When QoS peering with other ISPs that support similar classes of service as Assured service, the network model can be extended to include point-to-any-point, unidirectional and point-to-any-point, bidirectional models with a fixed aggregate rate r and burst B.

The reason to separate the point-to-any-point, unidirectional model from the point-to-any-point, bidirectional scheme is that the packet traffic is marked differently. The point-to-any-point, unidirectional model uses a marker at the ingress point to mark traffic while the point-to-any-point, bidirectional scheme uses a marker at the ingress point to mark traffic in the forward direction and Border Gateway Protocol (BGP) policy marking to mark traffic in the reverse direction.

Other subclasses of Assured services can also be developed using the network schemes. For example, in addition to the subclasses of services previously described regarding Virtual Leased Line services with both rate and burst size, they can also exist as Assured services and can also utilize those schemes provided that delay and jitter requirements are not too stringent. After the Virtual Leased Line analysis is performed in FIGS. 4 and 5, an analysis is made as to the Assured service class (410) regarding the marking and policing of Assured service traffic from point A to point $C_I$ with rate $r_{ACI}$ and burst $B_{ACI}$ (412) along the link. Once again, a similar analysis is made along each and every link (414) regarding the marking and policing of Assured service traffic from point A to point $C_I$ with rate $r_{ACI}$ and burst $B_{ACI}$ (416).

Two subclasses are unique to the Assured class of services:

1. A point-to-any-point, unidirectional Assured service with rate r and burst B can be built with the point-to-any-point, unidirectional network link. This service type can be used by a web host to distribute information to all clients on the network.
2. A point-to-any-point, bidirectional Assured service with rate r and burst B can be built with the point-to-any-point, bidirectional network link. This service type can be used by a corporation central office to exchange loss-sensitive information with all of its branch offices on the network.

If rate $r_{AC}$ is denoted as the rate of the point-to-point, unidirectional Assured service class from an ingress router A to egress router C (600), then the point-to-point, unidirectional Assured services can be subdivided into two cases based on the relationship between a customer's subscribed rate and access rate as follows:

1. Full-access-rate model where $R_{AC}=R_A$. This is the case where the subscribed Assured service rate equals the subscribed rate (602); therefore all traffic sent to router C (600) is marked by the ingress router A as Assured traffic regardless of whether the packet was previously marked as Assured service (604). Therefore, there is no requirement for rate-limiting, but there is a requirement to utilize packet filtering in order to determine whether the packet's destination is router C. If the packet's destination is router C, the packet can be marked as Assured traffic (604). Otherwise, a determination is made as to whether the packet can be routed to another destination or another subscription class of service can be utilized to send the packet.
2. Sub-access-rate model where $r_{AC}<R_A$. This is the case where the subscribed Assured rate is lower than the subscribed rate (602). Similarly to the case in Virtual Leased Line, all Assured traffic should be marked by the customer (608) prior to reaching the ingress router. In this example, both rate-limiting (610) and packet filtering are required checks to determine whether the rate of packets with Assured marking and having router C as their destination is within the subscribed rate $r_{AC}$ and burst B (608). If the packets are within these criteria, the packets maintain their Assured traffic status (604). Otherwise, if the packet is destined to router C and the rate $r_{AC}$ and burst B are exceeded, the packet is marked as Basic traffic (612). If the destination of the packet is not router B, a determination is made as to whether the packet can be sent by a lower subscription class, such as Basic.

Similarly, the point-to-any-point, unidirectional Assured service model can be subdivided into two cases based on the relationship between a customer's subscribed rate and access rate. If rate $r_{AS}$ is denoted as the rate of point-to-any-point, unidirectional Assured service from an ingress router A that connects to a customer router A, the following two cases exist:

1. Full-access-rate scheme where $r_{AS}=R_A$. This is the case where the subscribed Assured rate equals the subscribed rate so that all traffic from router A will be marked by the ingress router as Assured traffic except those packets that have been checked and marked as Virtual Leased Line traffic. Hence, there is no requirement for rate-limiting or packet filtering determinations.
2. Sub-access-rate scheme where $r_{AS}<R_A$. This is the case where subscribed Assured rate is lower than the subscribed rate. All Assured traffic is marked by the customer prior to reaching the ingress router A. In this illustration, there is a requirement to ascertain the rate limiting and also packet filtering to determine whether the packet arrivals with Assured marking are within rate $r_{AS}$ and burst B. If the packet arrivals are within the rate and burst limits, the packet is marked as Assured traffic. Otherwise, the packet is marked as Basic traffic.

For point-to-any-point, bidirectional Assured traffic, in order to avoid using egress policing/marker at the ingress router A for rate limiting traffic in the reverse direction, a limit is set for the full-access rate only, i.e., $r_{AS}=R_A$. In this case, all traffic from router A will be marked by the ingress router as Assured traffic with CAR except for those packets that have been checked and marked as Virtual Leased Line traffic. Hence, there is no requirement for either rate-limiting or packet filtering determinations to be made. All traffic destined for router A will be marked as Assured traffic with BGP policy propagation except those packets that have been checked and marked as Virtual Leased Line traffic.

Basic service is typically targeted for customers who need general Internet access and where the customer places a higher priority on costs as opposed to the critical aspects of real-time delivery. A minimum level of performance objectives is described with the Basic service and users are often denied bandwidth allocations during times of extreme and short-duration congestion conditions. Because of the terms of the service, the Basic customers can momentarily experience higher packet loss ratio and delay. Since Basic service is classified as best-effort service with no performance assurance, it is the simplest point-to-any-point, bidirectional scheme. All traffic to or from an ingress point is marked as Basic traffic if it is not marked as either Virtual Leased Line or Assured traffic.

Figure 7:
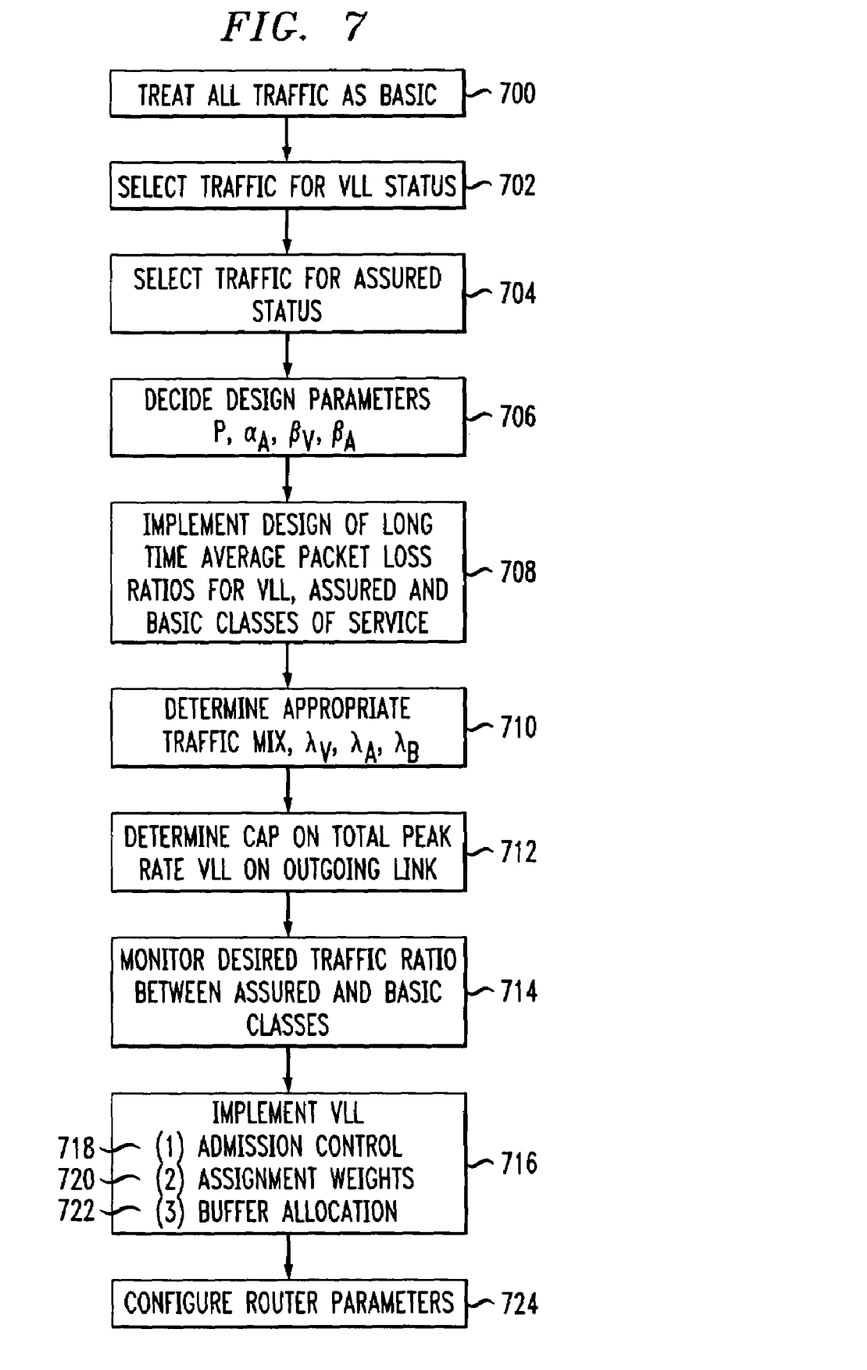
FIG. 7 illustrates a flow chart describing the configuration of the router parameters.

FIG. 7 illustrates a flow chart describing the configuration of the router parameters. Router parameters are determined based on the three classes of services between a particular link. First, packets are treated as the Basic traffic (700). Part of overall traffic flow is classified as Virtual Leased Line traffic (702) while the remaining traffic continues to be treated as Basic traffic. From the remaining Basic traffic, additional packets are selected and classified as Assured traffic (704). The following design criteria (706) for the router parameters is set to achieve:

1. Virtual Leased Line traffic packet loss approaching zero and minimization of delay and jitter.

$$P_V \approx p$$

2. QoS received by the Assured traffic flows is noticeably better than the Basic traffic flows during periods of congestion.

$$\frac{P_A}{P_B} \leq \alpha_A$$

The criteria in this equation are that the relative packet loss ratio of the Assured service versus the Basic service can be translated into the relative throughput ratio for transmission control protocol (TCP) connections.

3. Virtual Leased Line traffic is designed such that the QoS of service for the Assured and Basic traffic flows does not experience significant deterioration.

$$\frac{P_{all-V} - P_{all}}{P_{all}} \leq \beta_V$$

4. The Assured traffic does not significantly deteriorate the QoS of the Basic traffic.

$$\frac{P_B - P_{all-V}}{P_{all-V}} \leq \beta_A$$

The time average packet loss ratio is used at each outgoing link as a measure of QoS of the three classes. If $P_V$, $P_A$, and $P_B$ denote the long time average packet loss ratios (708) of the Virtual Leased Line, Assured, and Basic traffic, respectively, then $P_{all}$ denotes the long time average packet loss ratio if all traffic. If $P_{all-V}$ denotes the long time average packet loss ratio of the combined Assured and the Basic traffic, then both classes are treated as lesser quality of services and the Virtual Leased Line service receives premium status.

In order to find the appropriate traffic mix (710), each outgoing link is analyzed to satisfy the design principles of the subscriptions. If $\lambda_{all}$ is denoted as the total aggregate traffic rate for the link under analysis, then $\lambda_V$, $\lambda_A$, and $\lambda_B$ are denoted as the traffic rates of the Virtual Leased Line Assured, and Basic, respectively. Consequently, $\lambda_{all} = \lambda_V + \lambda_A + \lambda_B$.

If the total packet loss ratio remains the same when the traffic is divided into three classes or if WFQ and WRED only redistribute the total packet loss among the three classes, then the closed-loop impact from the TCP connections is ignored. If $P_A/P_B \approx \alpha_A$ is enforced, then any traffic mix falling into the shaded area (800) of FIG. 8 will satisfy both equations set forth in examples 3 and 4 above.

Figure 8:
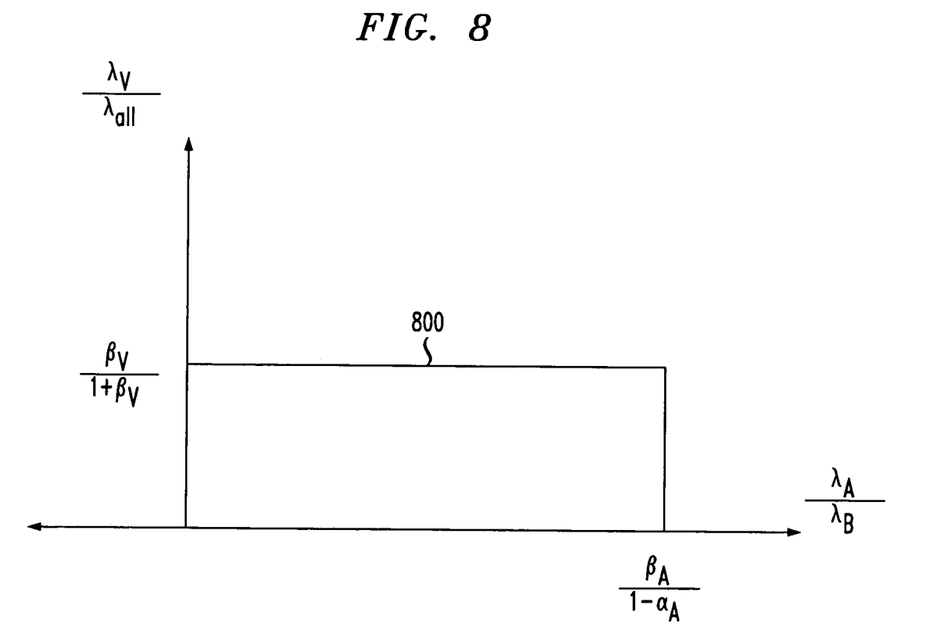
FIG. 8 illustrates a diagram of the optimal region of the traffic mix.

Typically, the profit margin decreases as the service quality and reliability decreases. Therefore, typically $\lambda_V$ provisioning is large relative to the total traffic, followed by the provisioning for $\lambda_A$ from the remaining traffic. Thus, the optimal traffic mix is usually achieved at the vertex where $\lambda_V$ and $\lambda_A$ are the largest at the same time. This usually occurs when:

$$\frac{\lambda_V}{\lambda_{all}} = \frac{\beta_V}{1+\beta_V}$$

and $$\frac{\lambda_A}{\lambda_B} = \frac{\beta_A}{1-\alpha_A}$$

For example, if the following design criteria are given: (1) the packet loss ratio for the Virtual Leased Line approaches zero, (2) the packet loss ratio of the Assured traffic is limited to no more than 50% of the Basic traffic (i.e., $\alpha_A = 0.5$), (3) deterioration of the Virtual Leased Line traffic is limited to less than 10% (i.e., $\beta_V = 0.1$), and (4) the Assured traffic should not allow Basic traffic to deteriorate by more than 20% (i.e., $P_A = 0.2$). If the average total traffic rate is estimated to be 100 Mbps ($\lambda_{all} = 100$ Mbps), the resulting average traffic rate for Virtual Leased Line service is 9.09 Mbps ($\lambda_V = 9.09$ Mbps) and the average traffic rate for the Assured service is 39.6 Mbps ($\lambda_A = 39.6$ Mbps).

The total peak rate of Virtual Leased Line traffic allowed on an outgoing link is governed by a rate cap (712) that is dependent on the total utilization of the link and degradation caused to the rest of the traffic. Determining the rate cap (712) can be obtained by letting $R_V$ be the total subscribed peak rate of Virtual Leased Line on the link under consideration and $u_V$ is the utilization of Virtual Leased Line. If the bandwidth of the link is R and the aggregate utilization of the link is $u_{all}$, then:

$$\frac{\lambda_V}{\lambda_{all}} = \frac{u_V R_V}{u_{all} W} \leq \frac{\beta_V}{1+\beta_V}$$

$$R_V \leq \frac{\beta_V u_{all}}{(1+\beta_V) u_V} R$$

In addition, only a fraction of the link bandwidth is dedicated to Virtual Leased Line through WFQ. If $w_V$ is the percentage of the link bandwidth assigned to the Virtual Leased Line, then in order to guarantee near zero packet loss for Virtual Leased Line services, $R_V < w_V R$ is optimal. Therefore:

$$R_V \leq c_V R$$

and $$c_V = \min\left\{\frac{\beta_V u_{all}}{(1+\beta_V) u_V}, w_V\right\}$$

provides the maximum percentage of the total Virtual Leased Line subscribed rate to a specific link. The value of $w_V$ is decided from jitter control consideration and is typically 50%.

This assumes that there exists an overall congestion along the link under consideration. When there is no overall congestion, QoS of all the three classes in terms of packet loss is not important. Hence, the value of $u_{all}$ should equal the minimum threshold of the link utilization $u_{congst}$ when the link is considered being congested. Typically, $u_{congst}$ has a value of 0.8. To determine $u_V$, assume that packets transmitted on a Virtual Leased Line are packet loss sensitive and therefore utilization should fall within a middle range. Also, since utilization of many Frame Relay 128k Permanent Virtual Circuits (PVCs) is approximately 50% during peak hours, selection of $u_V=0.5$ is appropriate. In some instances, $u_V$ can be adjusted higher on certain AR links where majority of the traffic is Virtual Leased Line traffic. Therefore, $c_V$ can be determined by:

$$c_V = \min\left\{\frac{0.4\beta_V}{(1+\beta_V)}, w_V\right\}$$

Once an appropriate value of $c_V$ has been determined, Virtual Leased Line bandwidth can be enforced across all lines by a value less than or equal to $c_V$.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A method for use in a packet network that carries at least two traffic classes, the method comprising
   selecting individually for each link of a plurality of links of said network a particular desired mix of the average rates of traffic among the traffic classes on that link during times of network congestion, and
   configuring parameters within said network in such a way that said mix of average traffic rates is substantially achieved,
   wherein said mix of average traffic rates is selected in such a way as to achieve a desired set of packet loss criteria for said traffic classes on said each link,
   wherein said set of packet loss criteria further includes a maximum desired packet loss ratio of a first one of said traffic classes, and
   wherein said set of packet loss criteria includes a desired maximum value, during periods of congestion over said each link, of a quantity that is a function of
   a) a packet loss ratio of a second one of said traffic classes and
   b) a packet loss ratio of a third one of said traffic classes.

2. The method of claim 1 wherein said function is the ratio of a) to b).

3. The method of claim 1 wherein the average packet loss ratio of said first traffic class is less than the average packet loss ratio of said second traffic class and the average packet loss ratio of said second traffic class is less than the average packet loss ratio of said third traffic class.

4. The method of claim 2 wherein one of said set of packet loss criteria is that a quantity given by
   a) the difference between
      i) a packet loss ratio of said second and third traffic classes combined, and
      ii) a packet loss ratio of all of said traffic classes combined, divided by
   b) said packet loss ratio of all of said traffic classes combined is no larger than a particular selected value.

5. The method of claim 2 wherein one of said set of packet loss criteria is that a quantity given by
   a) the difference between
      i) a packet loss ratio of said third traffic class, and
      ii) a packet loss ratio of said second and third traffic classes combined, divided by
   b) said packet loss ratio of said second and third traffic classes combined is no larger than a particular selected value.

6. The method of claim 4 wherein one of said set of packet loss criteria is that a quantity given by
   a) the difference between
      i) a packet loss ratio of said third traffic class, and
      ii) a packet loss ratio of said second and third traffic classes combined, divided by
   b) said packet loss ratio of said second and third traffic classes combined is no larger than a particular selected value.

7. A method for use in a packet network that carries first, second and at least a third traffic classes, the method comprising
   selecting individually for each link of a plurality of links of said network a particular desired mix of the average rates of traffic among the traffic classes on that link during times of network congestion, and
   configuring parameters within said network in such a way that said mix of average traffic rates is substantially achieved,
   wherein said mix of average traffic rates is selected in such a way as to achieve a desired set of packet loss criteria for said traffic classes on said each link, and
   wherein said first traffic class is provided with a lower packet loss ratio than said second traffic class and said second traffic class is provided with a lower packet loss ratio than said at least third traffic class.

8. The method of claim 7 wherein said set of packet loss criteria includes a desired maximum value, during periods of congestion over said each link, for a quantity that is a function of packet loss ratios of said second and said at least third traffic classes.

9. The method of claim 8 wherein said quantity is a function of the packet loss ratio of said second traffic class divided by the packet loss ratio of said at least third traffic class.

10. The method of claim 8 wherein said set of packet loss criteria further includes a maximum desired packet loss ratio of said first traffic class.

11. The method of claim 10 wherein one of said set of packet loss criteria is that any percentage increase, beyond an overall packet loss ratio of said traffic classes, in a combined packet loss ratio of said second and at least a third traffic classes that results from any decrease of a packet loss ratio of said first traffic class below said overall packet loss ratio, is no more than a particular amount.

12. The method of claim 10 wherein one of said set of packet loss criteria is that any percentage increase, beyond a combined packet loss ratio of said second and at least a third traffic classes, in a packet loss ratio of said at least third traffic class that results from any decrease of a packet loss ratio of said second traffic class below said combined packet loss ratio, is no more than a particular amount.

13. The method of claim 8 wherein said set of packet loss criteria further includes a substantially zero packet loss ratio of said first traffic class during periods of congestion over said each link.

14. The method of claim 13 wherein one of said set of packet loss criteria is that any deterioration in a combined packet loss ratio of said second and at least a third traffic classes that results from any decrease in a packet loss ratio of said first traffic class is no more than a selected percentage of the overall packet loss ratio of all of said traffic classes.

15. The method of claim 14 wherein one of said set of packet loss criteria is that any deterioration in a packet loss ratio of said at least third traffic class that results from any decrease in a packet loss ratio of said second other traffic class is no more than a particular percentage of a packet loss ratio of said second and at least a third traffic classes combined.

* * * * *